May 1, 1934.                    W. C. WEBER ET AL                    1,957,185
                    SEDIMENTATION APPARATUS AND SKIMMER THEREFOR
                       Filed Nov. 25, 1930         4 Sheets-Sheet 3
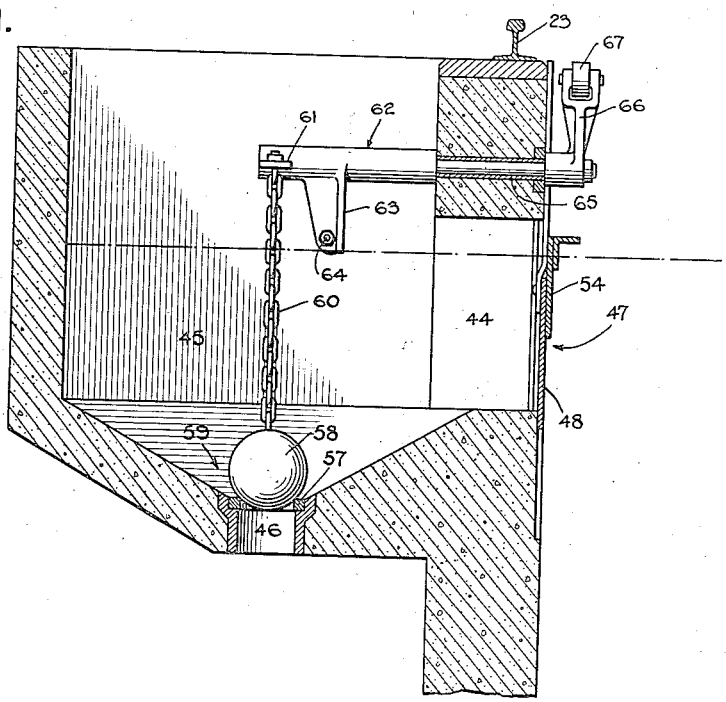
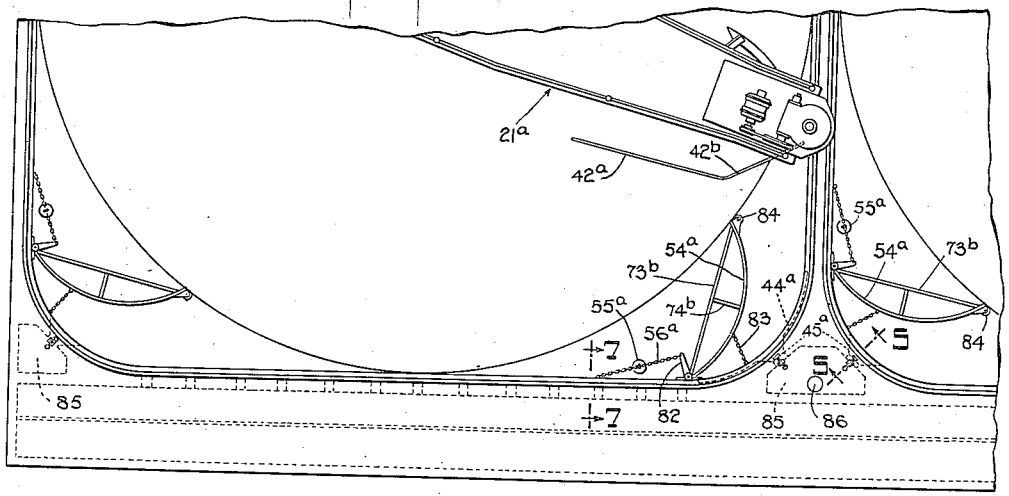
INVENTORS
WILLIAM C. WEBER
ARTHUR M. KIVARI
BY
ATTORNEY

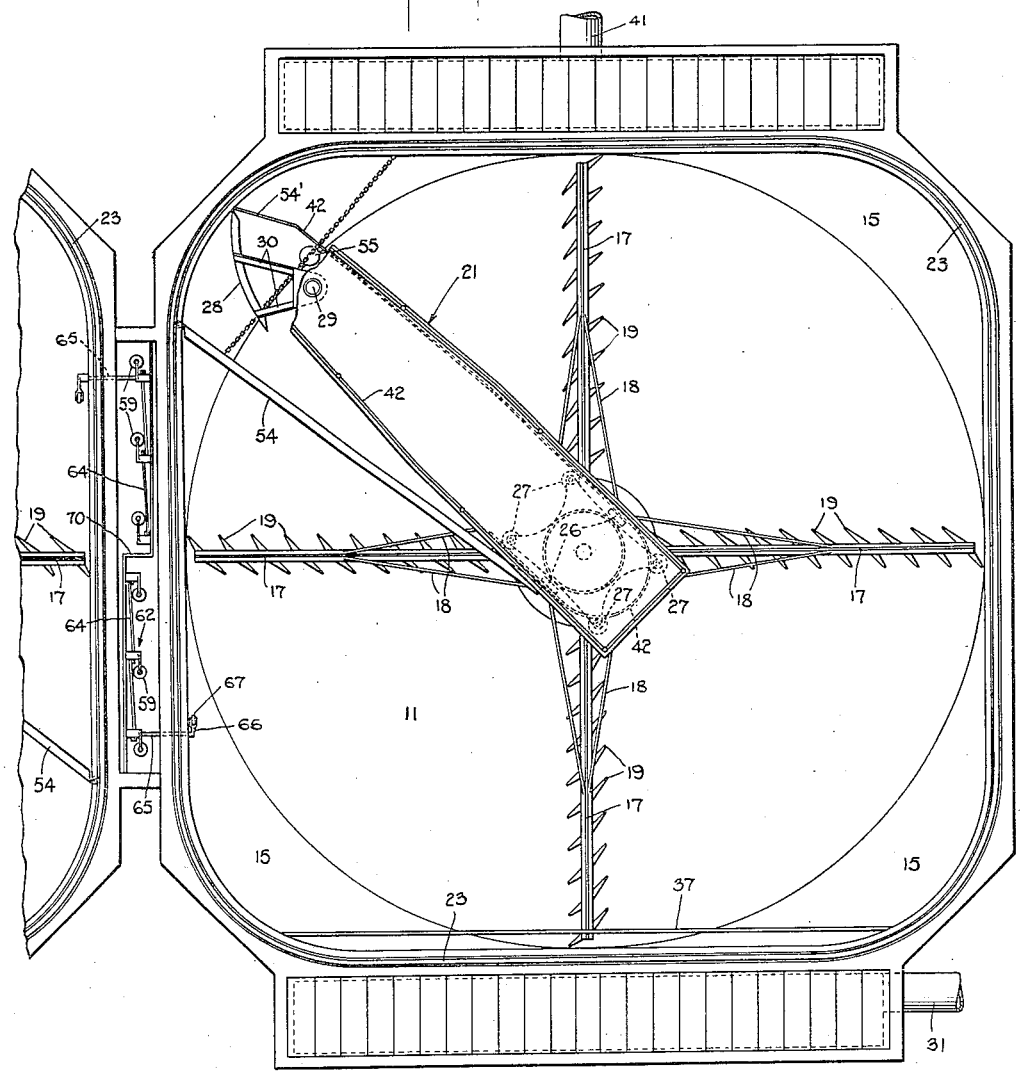

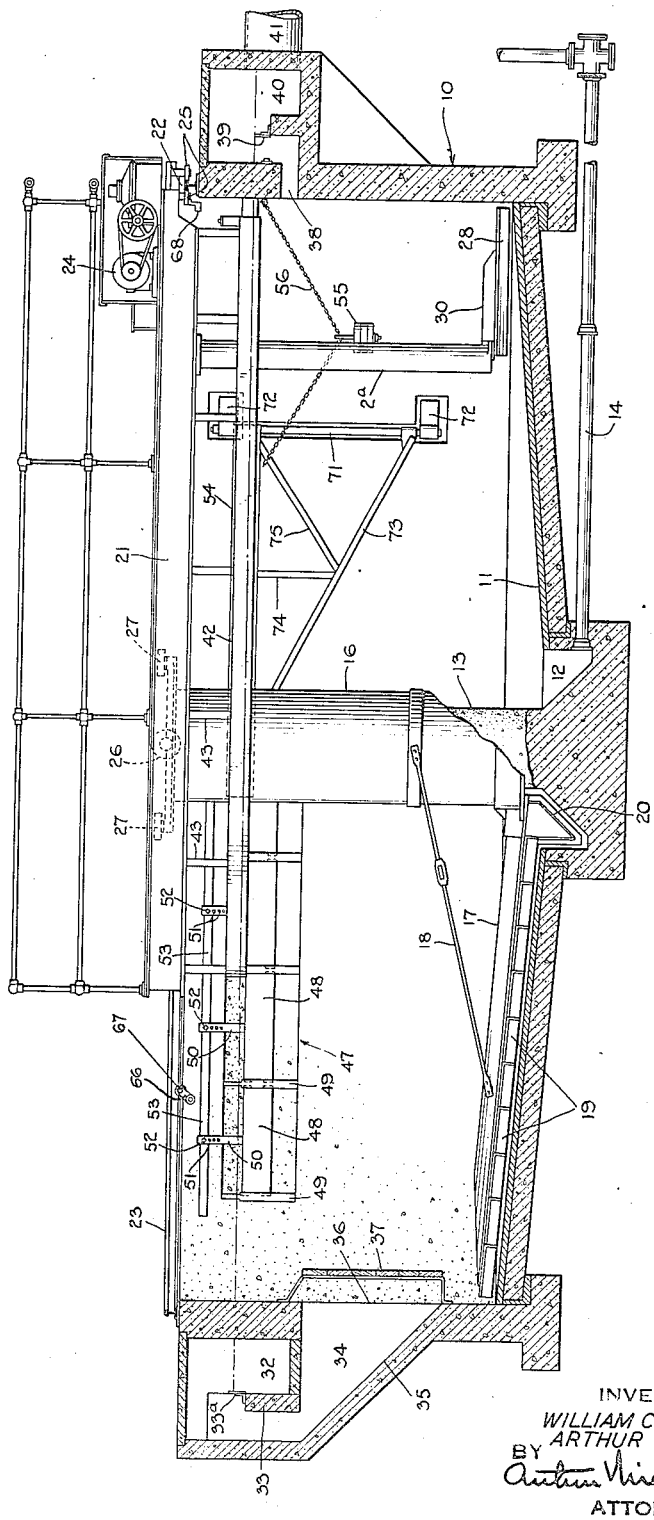

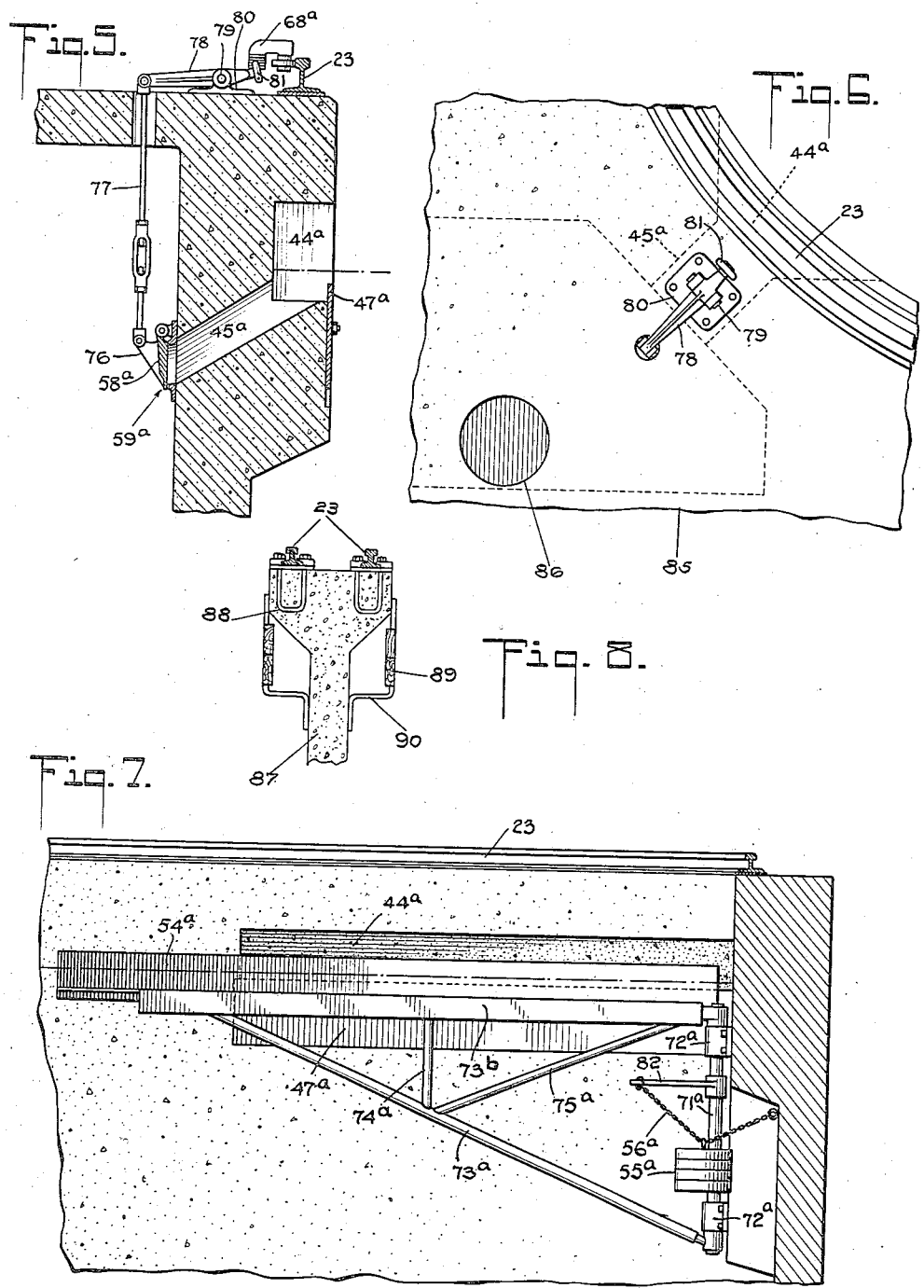

Patented May 1, 1934

1,957,185

UNITED STATES PATENT OFFICE 1,957,185

SEDIMENTATION APPARATUS AND SKIMMER THEREFOR

William C. Weber, Larchmont, N. Y., and Arthur M. Kivari, Los Angeles, Calif., assignors, by mesne assignments, to The Dorr Company, Inc., New York, N. Y., a corporation of Delaware Application November 25, 1930, Serial No. 498,094

15 Claims. (Cl. 210—55)

This invention relates to sedimentation apparatus or the like and more particularly to sedimentation apparatus provided with means for skimming floating material or scum from the surface of the liquid.

Heretofore sedimentation apparatus provided with means for skimming the surface of the liquid has been proposed, but the proposed skimming means was unsatisfactory in various respects, for example, the skimming means was not such as to assure effective skimming of substantially the whole surface of the liquid in the sedimentation tank, the removal from a tank of scum collected by skimming means was not accomplished as effectively as desired, the scum was not positively confined and forced out of the tank, and a considerable amount of liquid was removed with the scum.

According to the present invention, however, the surface of the liquid in such tank is thoroughly skimmed; the scum is collected and confined; the scum so collected is forced out of the tank into a scum chamber so as to hold back in the tank most of the liquid or pulp by displacement and, as this forcing out action is completed, the scum chamber is shut off from the tank proper; then, while the scum chamber is shut off from the tank, the outlet of the scum chamber is opened to discharge the contents thereof; and later the scum chamber outlet is closed and the scum chamber is again connected with the tank. This cycle of operation may be repeated indefinitely.

Therefore, the objects of the invention are in general attained by providing, in addition to a member revolving in a tank and controlled so that at one point thereof said member follows the contour of the tank, skimming means mounted on said revolving member, a scum pocket or chamber communicating with the tank and having an outlet which is normally closed, a swinging scum baffle hinged at the end thereof farthest along in the direction in which the revolving member moves and normally urged to open position but adapted to be closed by engagement by said revolving member, thereby sweeping scum, collected by the skimming means on said revolving member, into said scum pocket and acting to force back into the tank liquid displaced by said scum, and means controlled automatically by the revolving member for opening the outlet of the scum pocket while the swinging baffle is closed and again closing the same before the swinging baffle swings to open position. According to some forms of apparatus embodying the invention, each swinging baffle is at all times under the control of the rotating member and all of the scum gathered by the scum baffle on the rotating member is moved into the space between the scum outlet and the swinging baffle and is moved by the latter into the scum. According to other forms of apparatus embodying the invention, each swinging baffle is under the control of the rotating member only during the movement of the outer end of the rotating member along a limited portion of the periphery of the tank adjacent to the outlet with which the swinging baffle is associated.

I have selected a preferred embodiment of my invention for the purpose of more clearly describing the invention. I have accordingly illustrated it in the accompanying drawings in which:

Fig. 1 is a plan view illustrating a unit of sedimentation apparatus embodying one form of the present invention, and showing part of an adjacent unit to illustrate one way in which a plurality of units may be combined.

Fig. 2 is a view in elevation of the rotating structure partly broken to show the underlying structure, and showing the stationary tank structure in vertical section taken in a vertical plane passing through the vertical axis around which the rotating structure turns.

Fig. 3 is a sectional view illustrating a portion of the apparatus, including a scum chamber, into which the scum is forced by the swinging baffle while the scum discharge is closed and from which liquid is displaced into the tank by the scum, and which is emptied by opening the scum discharge valve or valves while the swinging scum baffle is in closed position.

Fig. 4 is a plan view showing the effluent end of a unit of sedimentation apparatus embodying another form of the invention, and also showing an adjoining portion of the effluent side of another unit adjacent to the first;

Fig. 5 is a section taken along the line 5—5 of Fig. 4;

Fig. 6 is a view on a larger scale of the part of the structure of Fig. 4 of which the section 5—5 was taken on Fig. 4;

Fig. 7 is a view in elevation of one of the swinging scum baffles, the tank structure being shown in section taken along the line 7—7 of Fig. 4 and looking in the direction of the arrows; and Fig. 8 is a vertical sectional view of the upper portion of the wall between the two tanks shown in plan in Fig. 4. In Fig. 8 there is shown the details by which rails are held in place on the wall.

Referring to the drawings, and more particularly to Figs. 1 and 2, 10 designates a sedimentation tank of the Dorr type (preferably of concrete construction) of generally rectangular shape but with rounded corners so that all material settling on the bottom of the tank can be reached by rake apparatus of the traction type. The bottom or floor of the tank includes a central portion 11 of circular outline with its upper surface sloping downwardly toward its center to a sludge gutter 12 extending around a central pier 13 and connected with a suction line 14 through which the settled material or sludge may be removed, and also substantially flat floor portions 15 at the corners. Rotatably mounted on the pier or column 13 is a drum 16 to the lower end of which are attached the inner ends of arms 17 extending substantially radially therefrom and substantially parallel to the sloping surface of the central portion 11 of the bottom of the tank. The arms 17 are also connected with the center drum 16 by tie rods 18 which serve to support the outer ends of the arms and also to resist sidewise stresses thereon, and are provided at their lower sides with rakes or rake blades 19 so inclined as to slowly work the settled material or sludge toward the gutter 12, and with a central scraper 20 projecting downwardly into the sludge gutter 12.

The central drum 16 is rotated by means including a truss or member 21 supported at its outer end by a traction wheel 22 carried thereby and resting on a rail 23 mounted on the top of the peripheral wall of the tank and extending around the tank, and at its inner end on the top of the central drum 16 to which it is connected in such a manner as to cause rotation of the drum when the outer end of the truss is driven by the traction wheel due to actuation of such traction wheel by an electric motor 24 which may be connected therewith by any suitable means involving speed reduction. The traction wheel is held on the rail by suitable means such as guiding rollers 25 connected with the truss and engaging the rail on opposite sides thereof, thus necessitating longitudinal movement of the truss across the top of the center drum. The connection between the truss and the drum to enable longitudinal movement of the truss, while retaining an operative connection to enable turning of the drum and rake structure, may be effected in any suitable manner as, for example, by providing at the top of the drum supporting wheels or rollers 26 on which the truss may travel longitudinally and rollers 27 for griding the truss in its longitudinal movement and also holding the truss and the drum together so that rotation of the truss will produce rotation of the rake structure.

The working of the settled material or sludge in the corners of the tank toward the center of the tank may be effected by means including a blade 28 suitably inclined from a radial direction to move the material toward the center of the tank and suspended from the truss so that as the outer end of the truss moves around a corner of the tank the blade 28 has a corresponding movement and thorough removal of the settled solids from the corner is assured. Such suspension may be effected by means including a downwardly extending post 29 and arms 30 projecting horizontally from the bottom of the post and connected at their outer ends with the blade.

The pulp or material to be treated is introduced through an influent conduit or pipe 31 into one end of an influent channel 32 provided in the tank structure just outside the main wall of the tank and extending along the greater part of one side of the tank. The outer wall 33 of the influent channel 32 forms part of a weir over which the pulp flows and passes downwardly to a chamber 34 having a substantially horizontal top or ceiling and a downwardly and inwardly inclined bottom 35. The chamber 34 communicates with the inside of the tank through an opening 36 substantially below the liquid level in the tank and extending along the greater part of the length of the corresponding side of the tank. At the top of such outer wall 33 is a weir member 33a preferably of angle iron.

At the inside of the tank is a baffle 37 parallel to and spaced from the inner surface of the wall at the influent end of the tank, and extending substantially from the level of the upper edge of the opening 36 down to substantially the level of the lower edge of the opening. The discharge opening 36 through which the pulp passes from the chamber 34 into the tank is so large in proportion to the quantity of pulp passing over the weir member 33a that the velocity of flow is not excessive and the baffle 37 prevents the stream of pulp from flowing directly toward the center of the tank and interfering with the settling action, and also tends to direct the suspended solids to the bottom of the tank. Preferably the influent channel is covered at a suitable height above the weir member 33a in any suitable manner as by means of planks, and preferably the bottom of the influent channel 32 is formed of concrete slabs.

At the effluent side of the tank, that is at the side opposite to that at which the pulp is introduced into the tank, the effluent liquid passes out of the tank below the liquid level therein and through a rather narrow horizontal slot 38 which extends along the greater part of the length of the effluent side or end of the tank, and then passes upwardly so as to flow over a weir 39 on the top of the inner wall of an effluent channel 40, and into said effluent channel, from which it is discharged through an effluent pipe 41 here shown as connected with the effluent channel near the middle thereof. The effluent channel is also preferably covered by suitable means such as referred to in connection with the influent channel.

In sedimentation apparatus of the type under consideration, it is desirable to separate from the liquid introduced in the influent pulp, not only the solids which settle and form the sludge but also material which tends to float on the surface and form a scum. The formation of this material into a layer of scum at the surface of the pulp and the removal of such accumulated scum before the liquid is discharged from the tank, is facilitated while preventing undue disturbance of the body of the liquid, by use of the baffle 37, and also by introducing the pulp to the tank below the liquid level therein and by withdrawing the effluent liquid from the tank through an opening below the liquid level in the tank.

The apparatus described up to this point is adapted to cause the scum material to collect on the surface of the liquid and to prevent withdrawal of such scum material from the tank with the effluent liquid. It is necessary, however, to remove the scum from the surface of the liquid in the tank. According to the present invention said scum material is removed by suitable means, of which one form will now be described. As shown in Figs. 1 and 2, there is provided a scum baffle 42 suspended from the truss 21 by means including members 43 depending from the truss. Scum baffle 42 extends from a point near the outer end of the truss to substantially the rear end of the truss on the advancing side thereof and then curves around to the other side of the truss for a reason to be brought out hereinafter. The baffle 42 is, of course, so located as to sweep the surface of the liquid and, due to the position of its forward end and to its length, will in a complete revolution sweep substantially the entire surface of the tank. It will also be evident that there is a tendency for the scum material advanced by the scum baffle 42 to move toward the periphery of the tank.

In order to discharge the scum from the tank there is provided a discharge opening or outlet 44 in in the form of a horizontal slot (Fig. 3) extending through one of the sides or side walls of the tank between the influent and effluent sides of the tank. This outlet extends both above and below the liquid level and, looking from the influent end of the tank toward the effluent end thereof, is located at the left. This outlet communicates with a scum chamber 45 provided at its bottom with circular discharge openings 46 which are normally closed by suitable valves to be described hereinafter. The flow of the scum through the outlet 44 is regulated by a weir 47 preferably made up of vertically adjustable sections 48 flush with the inner surface of the tank wall and guided by sliding engagement at their edges with members or plates 49 fixed to the wall with their faces toward the interior of the tank flush with the inner surface of the wall. Extending upwardly from the middle of each weir section or plate 48 is a bar or member 50 provided with a series of holes 51 through which screws 52 are passed and threaded into a horizontal holding bar 53 secured in the wall, for example, by being cast therein.

There should also be means for directing the scum collected by the scum baffle 42 toward the outlet 44 and for actually forcing the scum over the weir 47 and out through the outlet 44 into the scum chamber 45. To this end there is provided a swinging baffle 54 pivoted at one end at the inner surface of the tank wall at a point beyond the end of the outlet 44 which is farthest along in the direction in which the outer end of the truss moves, so that it can be swung back against the wall to move the scum, forced between the same and the outlet by the scum baffle 42 on the truss, over the weir 47 and into the scum chamber 45, and at the same time substantially close the opening between the tank and the scum chamber thus serving to avoid the loss of much liquid from the tank when the scum is discharged from the scum chamber. It should also be noted that the scum, as it is forced into the scum chamber tends to displace the liquid and shift it back into the tank.

The baffle 54 is normally urged to open position by means of a counter weight 55 attached to an intermediate point of a flexible connector, 56, such as a chain, attached at one end to the swinging baffle and at the other end to the wall of the tank at a suitable position along the wall. Preferably the baffle 54 is made with a flat upright portion or web and a strengthening flange at its upper edge, the flange projecting toward the inside of the tank to avoid interference with the bars or members 50 supporting the weir plates or sections 48 and being located at a level above the upper edge of the scum baffle 42 carried by the truss so as not to interfere with engagement of the web of the swinging baffle 54 by the baffle 42.

In this form of the apparatus the swinging baffle 54 is controlled at all times by engagement with the scum baffle 42 carried by the rotating actuating member or truss 21. As shown on Fig. 1 the outer end of the truss has moved past the pivot of the swinging baffle and the outer end of the swinging baffle is in engagement with the portion of the scum baffle 42 which extends around to the back of the truss. During the further movement of the truss, the point of contact between the baffle 54 and the baffle 42 will shift around the curved portion of the baffle 42 without great change of position of the swinging baffle 54, but upon engagement of the baffle 54 by an inclined part—54'—of the baffle 42 at the forward or leading side of the truss the swinging baffle 54 will be cammed toward the outlet 44 and will force the scum through such outlet into the scum chamber thereby tending to displace some of the liquid in the scum chamber back into the tank.

Upon approach of the point of contact toward the outer end of the truss the scum baffle 42 will tend to act more directly against the end of the swinging baffle 54 and therefore more directly against the pivot thereof and in opposition to the movement of the truss. To avoid this undesirable condition the outer end of this part of the baffle 42 is inclined rearwardly and thus acts more efficiently in camming the swinging baffle to closed position. Upon movement of the outer end of the truss past the pivot of the swinging baffle 54 the latter will again assume the position shown in Fig. 1. It will be evident that the scum advanced by the scum baffle 42 is confined between this baffle, the side of the tank, and the swinging baffle 54, and that there is a very effective and thorough removal of the scum.

The circular discharge openings 46 at the bottom of the scum chamber 45 are provided with annular valve seats 57 of suitable material, such as rubber, and are adapted to cooperate with suitable balls 58 to form ball valves 59. It is of course undesirable to withdraw liquid from the tank through the outlet 44 and the scum chamber, and to that end the ball valves 59 are controlled automatically so as to open while the outlet 44 is closed by the swinging baffle 54 and to close again before the swinging baffle is moved away from the outlet 44. Such control of the valves 59 is effected by connecting each of the balls 58 by means of a flexible connection 60, such as a chain, with the substantially horizontal arm 61 of a member or bell crank 62 pivoted to turn about the axis of a member mounted in the wall of the tank above the outlet 44 and projecting into the scum chamber 45; by connecting the substantially vertical downwardly extending arms 63 of the bell cranks by means of links 64; and by providing means whereby the bell cranks will be actuated automatically to open the valves 59 after movement of the baffle 54 to position for closing the outlet 44 and will be released to close the valves before the outlet 44 is again opened.

The bell cranks are so positioned that their horizontal arms 61 extend rearwardly with reference to the direction of movement of the outer end of the truss above the outlet 44 and the rearmost of the bell crank 62 is mounted on a shaft 65 which is journalled in the wall of the tank above the outlet 44 and at the inside of the tank wall is provided with an upright arm 66 carrying a roller 67 in position to be engaged by a member or shoe 68 (Fig. 2) connected with the truss at its outer end, and rocked thereby to turn the shaft 65 and thereby rock the bell cranks 62 to open the ball valves and discharge the scum from the scum chamber. It will be evident that as soon as the shoe 68 rides off the roller 66 the balls 58 will descend and the ball valves will be closed.

If the tank 10 be arranged entirely separate from other sedimentation tanks for the same general purpose, it would be desirable to have the scum chamber 45 of the same width throughout its length as well as extending along the greater part of the length of one side of the tank between the influent and effluent sides thereof, the swinging baffle 54 and the scum discharge outlet 44 from the tank being of substantially the same length as the scum chamber. Under such conditions, it would also be desirable to distribute the scum discharge openings 46 along the entire length of the bottom of the chamber.

If, however, two or more tanks of this kind are arranged side by side as parts of the same structure, it is desirable to modify the individual scum chambers so that two of them may be arranged in compact relation between successive tanks. To this end, one end of each scum chamber 45 is made narrow and the other end is made wide and the two scum chambers are so arranged with reference to each other that the wide portion of each one of them extends into the recess provided by the narrow portion of the other and the two scum chambers are separated by a relatively thin wall 70 which has two end portions, which are offset with respect to each other but lie in substantially parallel planes, and a central portion connecting the inner ends of said end portions and extending at right angles thereto.

It should be understood that the rake structures in the two tanks rotate in the same direction and that the hinged end of each swinging baffle 54 is opposite the free end of the corresponding baffle 54 in the adjacent tank. In apparatus with the scum chambers arranged in this manner, the discharge openings 46 are provided only in the wide portions of these chambers and the scum from the two scum chambers 45 is discharged into a common conduit or sewer to carry the same to any desired point.

Reference has been made to the fact that the swinging baffle 54 is pivoted at one end to the tank structure. Inasmuch, however, as the baffle is of considerable length and is supported from a pivot at one end thereof, it is necessary to provide a strong support therefor. To this end, the pivoted end of the swinging baffle is rigidly connected with a vertically positioned member 71 of considerable length and this member is connected with the tank wall (in a manner permitting it to turn about its vertical axis) by suitable means including brackets 72 at the top and bottom of the member 71 and rigidly attached to the wall. The member 71 is also connected with the swinging baffle by means of a strut or brace 73 extending from the lower end of the member 71 to the outer end of the baffle and by secondary members 74 and 75, of which the first extends from substantially the middle point of the brace 73 upwardly to the middle point of the baffle 54 and the second extends from the same point of the brace 73 to the inner end of the baffle adjacent to the member 71.

In Figs. 4, 5, 6, 7 and 8, there is disclosed a modified form of apparatus in which arcuate swinging scum baffle 54a is arranged to cooperate with scum outlets 44a (Fig. 5) in curved corners of the tanks and preferably adjacent to the effluent sides of the tanks and to close the same after forcing the collected scum into the same over weirs 47a. These scum outlets communicate at their centers with small downwardly inclined scum chambers 45a extending through the wall of the tank.

Such scum chambers are normally closed at their outer ends by valves 59a including flaps 58a pivoted at their upper edges and provided at their outer sides with brackets 76 which act as arms for shifting the flaps to open the valves and are operated by longitudinally adjustable links 77 pivoted thereto at their lower ends and pivoted at their upper ends to the outer ends of generally horizontal levers 78 mounted at points intermediate their ends on pivots 79 in brackets 80 projecting upwardly from the top of the wall of the tank, the inner ends of the levers being provided with rolls 81 to be engaged by a shoe 68a on the truss and being adapted to actuate the lever to swing the flaps to open position after the corresponding scum outlets 44a have been closed by the scum baffles 54a in a manner which will be described hereinafter.

In this form of apparatus, each swinging baffle 54a is pivotally supported (at the end of the corresponding outlet 44 farthest along in the direction of movement of the truss) by means including an upright member 71a attached to the corresponding end of the baffle 54a and pivotally mounted on the tank wall by means including fixed brackets 72a at the upper and lower ends of such member, a main strut or brace 73a extending from the lower end of member 71a to the lower edge of the baffle 54a at its outer end, a substantially horizontal member 73b connecting the upper end of the brace 73a with the member 71a, and three secondary connecting members 74a extending from the middle point of the brace 73a to the middle point of the member 73b, a diagonal member, 75a extending from the middle point of member 73b to the member 71a at the lower edge of the baffle, and 74b extending from the middle point of the member 73b to the baffle at its lower edge.

The scum baffle 54a is normally urged to open position by suitable means including, for example, a weight 55a, a flexible connector 56a to which the weight is attached at an intermediate point, the chain being connected at one end to the wall of the tank and at the other end to an arm 82 projecting from the member 71a and rigidly connected therewith. In this form of apparatus, the scum baffle is relatively short and is not under the control of the revolving truss at all times. It is therefore necessary to limit the outward movement of the baffle by suitable means such, for example, as a flexible connector 83 connected at one end with the wall of the tank and at the other end with the baffle.

As illustrated in Fig. 4, the truss or revolving member 21a is provided with a scum baffle 42a which has the same scum sweeping action as the baffle 42 of the first form of apparatus, but differs therefrom in some respects. Inasmuch as the truss in approaching each of the swinging scum baffles 54a tends to act directly on the end thereof and to force it back against its pivot, it is necessary to provide the scum baffle 42a with a camming portion 42b which will extend from a point substantially on the axis of the truss and at the inner surface of the tank wall forwardly and inwardly through a sufficient distance to assure effective camming engagement thereof with a roll 84 at the outer end of each scum baffle 54a. In this connection it should be noted that the various members connecting each scum baffle 54a with the corresponding upright member 71a are positioned below the level of the lower edge of the corresponding scum baffle 42a.

This arrangement with the swinging baffles and scum outlets positioned at the corners of the tank permits adjacent tanks to be placed very close together, the small scum chambers 45a emptying into chambers or compartments 85 positioned in the spaces provided by the rounding of the tanks at their corners and the scum collecting in the chambers being conducted therefrom through suitable drains or sewers 86 to any desired point.

As shown in Fig. 8, the wall 87 between the two tanks shown in Fig. 4 may be relatively thin but with a relatively broad top 88 providing overhangs above the level of the scum baffle 42. By such breadth of the top 88, there is provided room for the two rails extending around the two tanks for cooperation with the traction wheels at the outer ends of the corresponding rotating trusses 21a, and also for passage along the top of the wall. The position of the outer end of the inclined portion 42b of each rotating baffle 42a is determined by the position of the corresponding rail and such outer end of the baffle would not reach the adjacent surface of the wall under the overhang and therefore the scum could flow back around the outer end of the baffle. This difficulty may be overcome, however, by providing a scum baffle 89, preferably of wood, at a suitable level below the level of the overhang and substantially with the inner surface of the baffle substantially in the plane of the inner side of the broad top of the wall above the same. This scum baffle 89 may be supported by suitable means such as brackets 90 having upright portions to which the baffle 89 is secured so that the brackets do not project beyond the inner surface of the baffle, and having portions extending from the lower ends of said upright portions to the wall to which they are secured in any suitable manner.

Similar scum baffles 89 may be used at the influent and effluent sides of the tanks if required by corresponding overhanging tops of the walls.

It will be seen that the operation of the two forms of skimming means is substantially the same in that in each case the rotating scum baffle in each tank sweeps the surface of the liquid in the tank and cooperates with a swinging baffle to confine collected scum between these two baffles and the side of the tank so as to force the scum out of the tank into a scum chamber. In forcing the scum out of the tank into the scum chamber the swinging baffle is moved to a position to close the passage between the tank and the scum chamber, and while this passage is closed, the rotating truss operates suitable valve means to discharge the scum from the scum chamber, thus guarding against removal of liquid from the tank during the discharge of the scum from the scum chamber. As the truss advances, the discharge valves are again closed and after such closure the swinging baffle is swung away from the wall of the tank and communication between the tank and the scum chamber is reestablished. These steps may be repeated indefinitely.

In the first form of the apparatus each swinging baffle is at all times under the control of the rotating member and substantially all of the scum collected by the rotary member is confined by the two baffles and forced out at one time. In the second form each swinging baffle is not under control of the rotating member at all times, but the results of operation are very satisfactory and there are certain advantages in having the swinging baffles and scum outlet arranged in the corners.

It should be understood that various changes may be made in the construction and arrangement of the parts and that parts may be used without others without departing from the true spirit and scope of the invention.

What we claim is:—

1. In sedimentation apparatus or the like, the combination of a tank, a scum chamber adjacent to said tank and communicating therewith so as to receive therefrom scum substantially at the surface of the liquid therein, an outlet for said scum chamber, controlling means for said outlet, means including a movable scum baffle for collecting scum on the liquid in said tank and discharging it into said scum chamber, means controlled in synchronism with said movable scum baffle to shut off communication between said tank and said scum chamber after the discharge of scum from the tank to the scum chamber and after the passage of the movable scum baffle to reestablish such communication, and means controlled in synchronism with said movable scum baffle for actuating the outlet controlling means to open said outlet and discharge the scum from the scum chamber while communication between the tank and scum chamber is shut off and to close said outlet before such communication is re-established.

2. In sedimentation apparatus or the like, the combination of a tank, a scum chamber communicating with said tank at the liquid level therein to receive scum therefrom, means for collecting and sweeping scum to the portion of the tank communicating with the scum chamber, means for sweeping scum thus collected into the scum chamber and shutting off communication between the same and the tank and later reestablishing such communication, and means for discharging the scum from the scum chamber while the communication between same and the tank is shut off.

3. In sedimentation apparatus or the like, the combination of a tank having a weir at its periphery, a scum chamber to receive scum therefrom over the weir, a rotary scum baffle to sweep scum before it, and means including a swinging baffle to cooperate with the rotary baffle in confining scum between the two baffles and the weir and in moving the scum thus confined into the scum chamber.

4. In sedimentation apparatus or the like, the combination of a tank having a weir at its periphery, a scum chamber positioned to receive scum over said weir and having an outlet valve normally urged to closed condition, a rotary member including a scum baffle to collect scum, means including a swinging baffle normally urged to open position and controlled by said rotary member to cooperate therewith in confining scum between the two baffles and the side of the tank and in moving the confined scum into the scum chamber while at the same time shutting off the scum chamber from the tank, and means operated by said rotary member while the swinging baffle is closed to open the outlet valve to discharge the scum from the scum chamber and also to cause the valve to close before the swinging baffle moves to reestablish communication between the scum chamber and the tank.

5. In sedimentation apparatus or the like, the combination of a tank having a weir at its periphery, a scum chamber at the outer side of said weir and relatively shallow so that the scum as it enters the chamber will tend to displace liquid therein back into the tank, skimming means adapted to skim the tank, and an intermittently operated baffle adapted to force the collected scum over the weir and shut off communication over the weir for a suitable period so that the scum chamber can be emptied without drawing off any substantial amount of the liquid in said tank.

6. In sedimentation apparatus or the like, the combination of a tank, means for receiving scum from said tank, a weir separating said tank from such scum receiving means, skimming means for said tank including a baffle movable into position to shut off communication between such tank and the scum receiving means, and means for discharging scum from said scum receiving means while the tank liquid is held back.

7. In sedimentation apparatus or the like, the combination of a tank, a scum chamber, means for separating said scum chamber from said tank including a weir with its upper edge below the liquid level in said tank, a rotary member rotating in said tank, a scum baffle carried by said rotary member extending along the forward side of said rotary member to the rear end thereof and then curving completely around the inner end of the rotating member and outwardly along the rear side of the rotary member, a swinging baffle hinged adjacent to said weir and of such length that its free end will be in engagement with the rotary scum baffle during the movement of the tip of the rotary scum baffle from the pivoted end of the swinging baffle to the point at which said tip of the rotary scum baffle engages the free end of the swinging baffle, and the latter lies along the weir to shut off communication, above the upper edge of said weir, thereby confining all of the scum swept up by the rotary baffle and forcing it out of the tank.

8. In sedimentation apparatus including two tanks arranged side by side for use in parallel and rotary skimming baffles in said chambers arranged to rotate in the same direction, the combination of a dividing wall between said tanks including individual scum discharge chambers extending side by side in said wall within the limits of the ends of the openings between said tanks and said chambers, each of said scum chambers comprising a narrow portion at the end adjacent to the pivot of the swinging baffle and a wide portion adjacent to the other end of the opening, the two scum chambers being arranged with the wide portion of each of them adjacent to the narrow portion of the other, and swinging baffles each pivoted adjacent to the outer end of the reduced portion of the corresponding scum chamber and extending to the other end of such chamber and arranged to be controlled by the corresponding rotary baffle.

9. In sedimentation apparatus or the like of the traction type including a tank of generally rectangular shape, the combination of a scum chamber adjacent to the tank but separated therefrom by means including a weir with its upper edge below the liquid level in the tank, a swinging baffle pivoted at one end so as to swing alongside of said weir to force scum thereover and then to shut off communication between the tank and the scum chamber, means for urging said swinging baffle inwardly for the reception of scum between the same and the wall of the tank, a device rotating about the axis of the tank and including a rotating scum baffle to sweep the surface of the liquid and provided with an inclined portion to engage the rearwardly extending free end of the swinging baffle and move it into position along said weir, and means to limit the inward swing of said swinging baffle.

10. An apparatus of the class described comprising a tank, a rotating radially located mechanism, scum sweeping means thereon whereby rotation of said mechanism collects scum in front thereof, a pivotally mounted intermittently operated baffle arm, and means for operating said arm to remove the collected scum in front of said mechanism at a certain zone in the path of travel thereof.

11. An apparatus of the class described comprising a tank, a side wall for said tank having a scum exiting passage therein, a rotating radially located mechanism, scum sweeping means thereon whereby rotation of said mechanism collects scum in front thereof, an intermittently operated baffle for removing collected scum from said scum sweeping means when in operation, and means for closing said scum exiting passage with said baffle when in non-operation.

12. An apparatus of the class described comprising a tank, a rotating radially located scum collecting mechanism therein adapted to sweep scum in front thereof, and non-radially located pivoted means supported from the tank wall for mechanically removing collected scum from said collecting mechanism by sliding contact therewith.

13. An apparatus of the class described comprising a tank, a rotating radially located scum collecting mechanism therein adapted to sweep scum in front thereof, and means pivotally operated in one direction by said mechanism for mechanically removing collected scum from said collecting mechanism.

14. An apparatus of the class described comprising a tank, a rotating radially located scum collecting mechanism therein adapted to sweep scum in front thereof, an intermittently operated element for mechanically removing collected scum from said collecting mechanism, said element pivotally operated in one direction by said mechanism and constant pressure means for urging said element in the other direction.

15. In an apparatus of the class described, a tank, a radially located pivoted scum collector, a scum exit from said tank, and a second pivoted member for removing collected scum from said scum collector and forcing the thus removed collected scum through said scum exit.

WILLIAM C. WEBER.
ARTHUR M. KIVARI.